United States Patent [19]

Payne

[11] Patent Number: 5,443,210
[45] Date of Patent: Aug. 22, 1995

US005443210A

[54] SPRAYING APPARATUS

[75] Inventor: Nicholas J. Payne, Sault St. Marie, Canada

[73] Assignee: Her Majesty the Queen in the Right of Canada as Represented by the Minister of Energy, Mines, Resources and Forestry, Quebec, Canada

[21] Appl. No.: 211,368

[22] Filed: Sep. 29, 1992

[86] PCT No.: PCT/CA92/00427

§ 371 Date: Mar. 30, 1994

§ 102(e) Date: Mar. 30, 1993

[87] PCT Pub. No.: WO93/06721

PCT Pub. Date: Apr. 4, 1993

Related U.S. Application Data

[63] Continuation-in-part of Ser. No. 769,177, Sep. 30, 1991, Pat. No. 5,246,166.

[51] Int. Cl.⁶ .................................................. B05B 1/28
[52] U.S. Cl. ..................................... 239/104; 239/693; 239/124; 239/597
[58] Field of Search ................ 239/597, 598, 599, 124, 239/104, 504, 499, 693, 690, 708

[56] References Cited

U.S. PATENT DOCUMENTS

| 1,588,503 | 6/1923 | Spigelmire . |
| 2,577,238 | 12/1951 | Edwinson et al. . |
| 3,197,299 | 7/1965 | Stull et al. . |
| 3,523,646 | 8/1970 | Waldrum . |
| 3,757,491 | 9/1973 | Gourdine . |
| 3,784,111 | 1/1974 | Piggott . |
| 4,310,474 | 1/1982 | Iyengar . |
| 4,412,654 | 11/1983 | Yates et al. . |
| 4,447,413 | 5/1984 | Rippstein, Jr. . |
| 4,563,840 | 1/1986 | Orakami . |
| 4,572,165 | 2/1986 | Dodier . |
| 5,246,166 | 9/1993 | Payne .................................. 239/124 |

FOREIGN PATENT DOCUMENTS

| 853043 | 10/1970 | Canada . |
| 948239 | 5/1974 | Canada . |
| 956671 | 10/1974 | Canada . |
| 1051286 | 3/1979 | Canada . |
| 1224982 | 8/1987 | Canada . |
| 1258834 | 8/1989 | Canada . |
| 2014779 | 4/1990 | Canada . |
| 0157089 | 9/1985 | European Pat. Off. . |
| 0326045 | 2/1989 | European Pat. Off. . |
| 3809517 | 5/1989 | Germany . |
| 8701909 | 9/1987 | WIPO . |

OTHER PUBLICATIONS

"Droplet Size Characteristics for Insecticide and Herbicide Spray Atomizers" (The Canadian Journal of Chemical Engineering, vol. 67, Oct. 1989) pp. 752-76-1-J. J. C. Picott, et al.

"A Laboratory Device for Producing Single Drops in Uniform Sizes of 150-450 μm Diameter" C. R. Merritt & J. A. Drinkwater, pp. 457-462 (Agricultural Research Council Weed Research Org.).

Primary Examiner—Andres Kashnikow
Assistant Examiner—Christopher G. Trainor
Attorney, Agent, or Firm—Bell, Seltzer, Park & Gibson

[57] ABSTRACT

The present invention relates to a spraying apparatus and a method of using the same. The spraying apparatus can be used in the spraying of herbicides or insecticides from an aircraft or from the ground. The apparatus provides a separation chamber to remove the small drop component of the spray so that the component leaving the apparatus is essentially free of small drops. Small drops have slight fallspeeds and are subject to wind drift, causing off-target deposits and potential biological impact outside the treatment areas.

15 Claims, 2 Drawing Sheets 5,443,210

SPRAYING APPARATUS

CROSS-REFERENCE TO RELATED APPLICATION

This application is a 371 of PCT/CA92/00427 filed Sep. 29, 1992, which is a continuation of application Ser. No. 07/769,177, filed Sep. 30, 1991, and now U.S. Pat. No. 5,246,166.

BACKGROUND OF THE INVENTION

The present invention relates to a spraying apparatus and a method of using the same. This spraying apparatus can be used for example in the spraying of the herbicides and insecticides from an aircraft or from the ground. This apparatus provides a means for removing the small drop component of the spray before it leaves the apparatus.

The pesticides used in agriculture and forestry are usually applied in sprays, either aerially or from the ground. A limitation of the atomizers presently available for operational use has to do with the generation and release of small drops, herein defined as measuring drops having diameters less than 100 microns. These drops have slight fallspeeds and are subject to wind drift, causing off-target deposits and potential biological impact outside the treatment areas. Pesticide drift is a significant problem related to the agricultural and silvicultural use of pesticides, and is the basis for several regulatory restrictions on pesticides spraying, and is furthermore the cause of operational inefficiencies.

Various means have been tried to reduce the small drop fraction in pesticide spray clouds. Two operational atomizers have been designed to reduce the small drop fraction of the spray cloud, the Microfoil (Trade-mark of Rhone Poulenc, Lansdale, Pa., U.S.A.) and Thru Valve (Trade-mark of Waldrum Specialties Inc. Ambler, Pa., U.S.A.) booms, but these have achieved only partial success. (Picot et al., 1989, Canadian Journal of Chemical Engineering 67:752–61). Laboratory devices can provide narrow drop size spectra with a very small drop fraction. However, these are not suitable for practical operational applications because of flow rate limitations and the requirement for controlled operating conditions, e.g. lack of mechanical vibrations, constant flow rate, tank mix physical properties etc. (e.g. Merritt and Drinkwater, 1977, Pestic. Sci. 8:457–62).

Polymeric tank mix additives such as Nalcotrol (Trade-mark) have also been developed to reduce the small drop fraction. However, these have not eliminated the small drop fraction but only increased the size of the large drop portion of the cloud (Yates et al., 1985, Report FPM 85-2, USDA-FS, Davis, Calif., U.S.A.). The problem of small drop production is exaggerated when atomizers are mounted on aircraft, because the effect of the aircraft slipstream is to increase small drop proportion due to the relatively large amount of aerodynamic energy available for atomization.

There is an outstanding need for an atomization device for use on aircraft or in ground-based applications that provides better control of the small drop fraction of the spray cloud to substantially reduce or eliminate offtarget deposit.

SUMMARY OF THE INVENTION

The present invention provides a spraying apparatus for use in the application of insecticides, pesticides or the like from aircraft or ground-based sprayers. This apparatus provides improved drop size spectra compared with those produced by presently available operational devices, by substantially removing the small drop component.

Accordingly, the present invention provides a spraying apparatus comprising; an atomizer adapted to produce a flat planar spray, having a small drop component, from a liquid; a separation chamber having a drop exit opening; means to pass said spray in a planar path across said chamber to be delivered through said exit opening; separation means to remove the small drop component of said spray so that the component passing through said exit opening is essentially free of the small drop component, wherein said separation means comprises means for deflecting the small drop component transversely out of the planar path of the spray in said separation chamber.

A further aspect of the invention provides a method for producing a spray comprising; introducing a spray, having a small drop component, in a flat planar path into a separation chamber having an exit opening; deflecting the small drop component of said spray transversely out of the planar path of the spray; exiting the spray, essentially free of the small drop component, through the exit opening of the separation chamber.

The apparatus preferably comprises a flat-fan hydraulic nozzle mounted in an atomization chamber having a transfer slot in the wall opposite the nozzle to admit the spray in a planar path to an adjacent separation chamber, which has means to create a crosswind to be directed through the spray to deflect the small drop component from the planar path. The separation chamber also has an exit opening in the form of a slot in the end wall to permit the exit of the spray essentially free of the small drop component. The device also includes equipment to create the crosswind, separate the winnowing air flow and suspended drops, and collect the accumulated liquid.

BRIEF DESCRIPTION OF THE DRAWINGS

The invention will be further described with reference to the accompanying drawings showing, by way of an example, an embodiment of the invention, wherein.

DETAILED DESCRIPTION OF THE PREFERRED EMBODIMENTS

Figure 1:
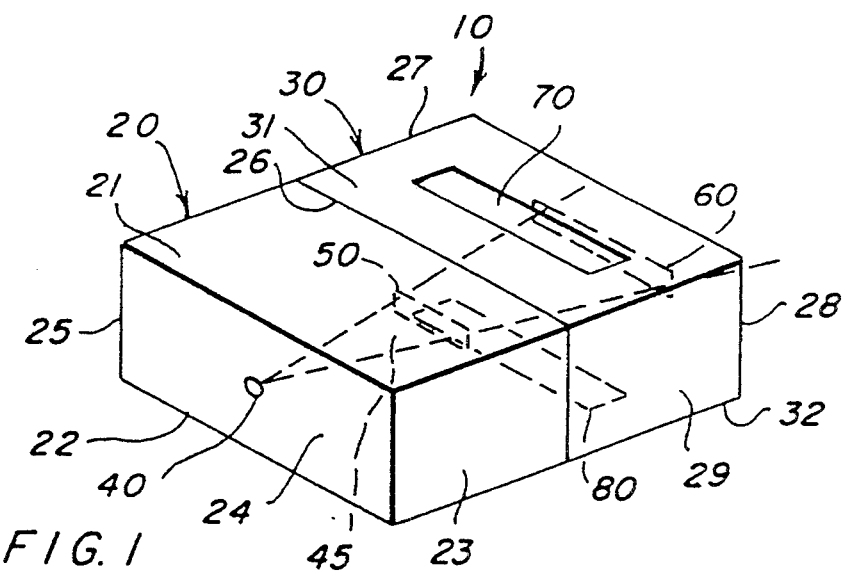
FIG. 1 is a schematic perspective view of the apparatus of the present invention.

Referring to the drawings, the spraying apparatus, shown generally at 10 in FIG. 1, comprises an atomization chamber 20 connected to a separation chamber 30. The chambers 20, 30 each contain a top wall 21, 31, a bottom wall 22, 32, and four side walls 23 to 26 and 26 to 29 (respectively), the wall 26 being common to both the chambers 20 and 30.

The atomization chamber 20 contains a flat-fan hydraulic nozzle 40 in side wall 24. Side wall 26 contains a horizontal transfer slot 50 that communicates between the atomization chamber and the separation chamber.

The separation chamber 30 also contains a horizontal exit slot 60 in side wall 28. Exit slot 60 is parallel to and aligned with the transfer slot 50 and with the nozzle 40. The separation chamber 30 contains openings 70 and 80 in the top wall 31 and bottom wall 32, respectively.

Figure 2:
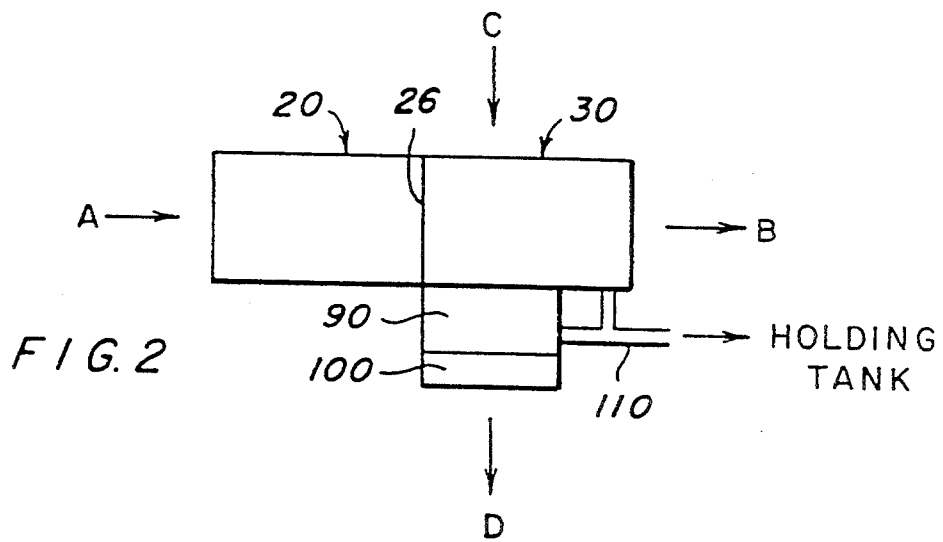
FIG. 2 is a schematic side view of the apparatus of FIG. 1.

Referring to FIG. 2, the separation chamber 30 is shown as being connected to a separator 90 which is located beneath it in communication with the bottom opening 80. Piping 110 provides a connection between the separator 90 and the separation chamber 30 as well as between the separator 90 and a spray mix holding tank (not shown). The separator can, for example, be a cyclone separator, cascade impactor or filter. Located directly beneath the separator 90 is a fan 100.

Referring to FIGS. 1 and 2, the operation of the apparatus is as follows. A spray mix containing the pesticide, herbicide or the like is introduced into the flat fan hydraulic nozzle 40 in the atomization chamber 20 where a flat planar spray 45 is produced. The spray travels through the apparatus 10 in the direction of arrows A to B (FIG. 2). The liquid travels across the atomization chamber 20 where atomization is completed and enters the separation chamber 30 via transfer slot 50. In the separation chamber 30, the fan 100 creates a crosswind, by aspiration (in the direction of arrows C to D) flowing between the opening 70 and the opening 80 and leaving the apparatus downstream of the fan as indicated by the arrow D. The crosswind is thus transverse to the plane of the planar spray. The crosswind causes the small drop component of the spray to be deflected out of the planar path of the spray. The spray, essentially free of the small drop component, exits the separation chamber by exit slot 60.

The deflected component for the most part is entrained in the crosswind and leaves the separation chamber 30 through opening 80, and thereby enters the separator 90 from where it is returned to the spray mix holding tank by piping 110. Some of the deflected component of the spray may impinge on the side walls of the separator chamber particularly on the wall below the exit slot 60. This material will drain to the bottom of the chamber 30 and then leaves through tubing 110 to be returned directly to the holding tank.

The rate of flow of the crosswind, the width of the exit slot, the velocity and width of the planar spray, and the area of the spray exposed to the crosswind all influence the extent of removal of the small drop component and all of these can be adjusted depending on particular requirements.

The use of a separate atomization chamber prevents the airflow in the separation chamber from causing interference with the atomization process. The crosswind air intake is baffled to suppress turbulence in the airflow that may excessively disturb the spray trajectory. The creation of the crosswind by aspiration minimizes the turbulence in the crosswind.

EXAMPLE 1

An apparatus having the following dimensions was used:

An atomization chamber (20) 25 cm wide, 8 cm deep and 8 cm long, with a transfer slot (50) 2 cm×12 cm, opening into a separation chamber (30) 25 cm wide, 8 cm deep, 7 cm long with an exit slot (60) 2×20 cm, and openings measuring 6×20 cm in the upper and lower walls (31 & 32) for the winnowing crosswind.

The flat-fan hydraulic nozzle used to generate the planar spray was a Spraying Systems 8002 nozzle (Spraying Systems Company, Wheaton, Ill., U.S.A.) operated at pressures of 69 and 138 kPa, with a tank mix of tap water containing Erio Acid Red dye at 0.4% w/w. This nozzle has an elliptical orifice with an opening about 0.375 mm$^2$ in area (major axis dimension 1.5 mm, minor axis dimension 0.5 mm) and the liquid flow rates and velocities at the orifice were 0.36 l/min and 16 m/s respectively for the 69 kPa pressure setting and 0.54 l/min and for 24 m/s the 138 kPa pressure setting.

The dropsize spectra in the spray plume emerging from the exit slot was measured by sampling the spray using a 10×10 cm highly calendered white Kromekote card. The card was passed quickly through the plume at a distance of 30 cm from the exit slot. A second sample was taken in a similar manner. Stain sizes on the Kromekote cards were measured using an image analysis system (Artek, Farmingdale, N.Y., U.S.A.), and 100 stains per card were sized. A spread factor of 1.8 was used to convert stain sizes to dropsizes (Waite, 1978, USDA-FS Technical bulletin #1596).

Results

TABLE I

Measured dropsize spectra from the apparatus with and without a winnowing crosswind.

| Statistic (microns) | Liquid pressure (kPa) | | | | | |
|---|---|---|---|---|---|---|
| | 69 | | | 138 | | |
| | Crosswind (m/s) | | | | | |
| | 0 | 2.5 | 5.0 | 0 | 2.5 | 5.0 |
| Volume median diameter ($D_{V0.5}$) | 567 | 809 | 732 | 425 | 469 | 548 |
| Number median diameter | 228 | 393 | 441 | 110 | 251 | 304 |
| $D_{V0.1}$ | 308 | 407 | 423 | 204 | 251 | 298 |
| $D_{V0.9}$ | 921 | 1076 | 1073 | 784 | 819 | 850 |

TABLE 2

Spray volume proportion in drops having a diameter (D) of less than 100 microns, and reduction from crosswind.

| Statistic (%) | Liquid pressure (kPa) | | | | | |
|---|---|---|---|---|---|---|
| | 69 kPa | | | 138 kPa | | |
| | Air flow velocity (m/s) | | | | | |
| | 0 | 2.5 | 5.0 | 0 | 2.5 | 5.0 |
| Proportion of spray volume in drops with D < 100 μm | 0.248 | 0.00139 | 0.0000532 | 1.49 | 0.116 | 0.0046 |
| Reduction in spray volume in drops with D < 100 μm from | — | 99.5 | 99.98 | — | 92.2 | 99.7 |

TABLE 2-continued

| | Spray volume proportion in drops having a diameter (D) of less than 100 microns, and reduction from crosswind. | | | | | |
|---|---|---|---|---|---|---|
| Statistic | Liquid pressure (kPa) | | | | | |
| (%) | 69 kPa | | | 138 kPa | | |
| | Air flow velocity (m/s) | | | | | |
| | 0 | 2.5 | 5.0 | 0 | 2.5 | 5.0 |
| crosswind | | | | | | |

The following results demonstrate the percentage reduction in drops having a diameter of less than 100 microns that occurs under set airflow conditions, compared to no crosswind.

TABLE 3

| Air flow velocity (m/s) | Reduction in spray volume (%) | |
|---|---|---|
| | 69 kPa | 138 kPa |
| 2.5 | 99.5 | 92.2 |
| 5.0 | 99.98 | 99.7 |

Figure 3:
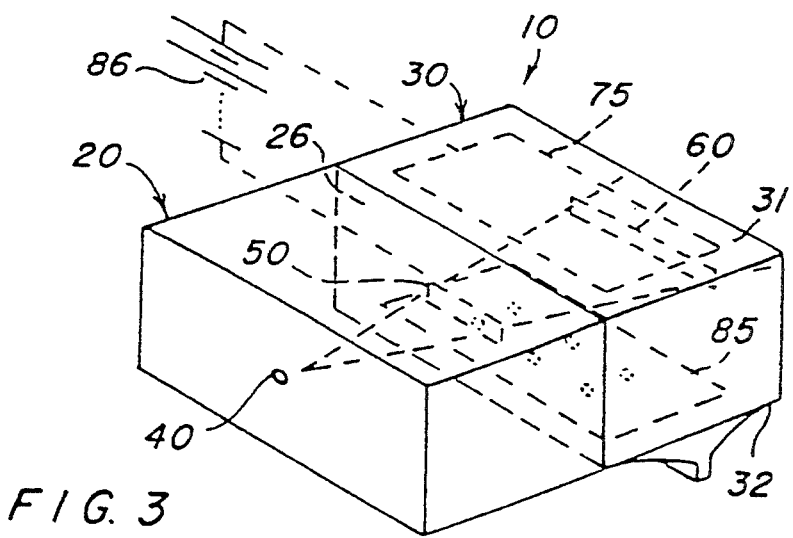
FIG. 3 is a schematic perspective view showing a further embodiment of the invention.

FIG. 3 illustrates another embodiment of the invention whereby the separation of the small component is achieved by the application of an electric field to the spray plume. The apparatus 10 comprises atomization chamber 20 which is identical to the first embodiment. The separation chamber 30 also comprises transfer slot 50 and exit slot 60 as in the first embodiment. The separation chamber in FIG. 3 contains flat plates 75 (top) and 85 (bottom) coplanar with the top 31 and bottom 32 walls of the separation chamber and positioned above and below the spray plume and held at earth and an elevated potential to provide a uniform electric field through the plume. The electric field is generated by a power source 86. Spray drops are generally charged on formation, and small drops have a larger charge-to-mass ratio than large drops and are therefore deflected to a greater extent by an electric field. With an appropriate electric field applied across the plates 75 and 85, the small drops will be deflected sufficiently to be impacted on the end wall above, or preferably below, the exit slot 60, or deposited on the upper 75 or lower 85 plates. The lower plate 85 is perforated to allow liquid to drain to the bottom of the separation chamber into piping 110 returning the spray mix holding tank as indicated in FIG. 2. The voltage difference between the flat plates, the width of the exit slot, the velocity and width of the planar spray will all influence the extent of removal of the small drop component and can be adjusted depending on particular requirements.

Figure 4:
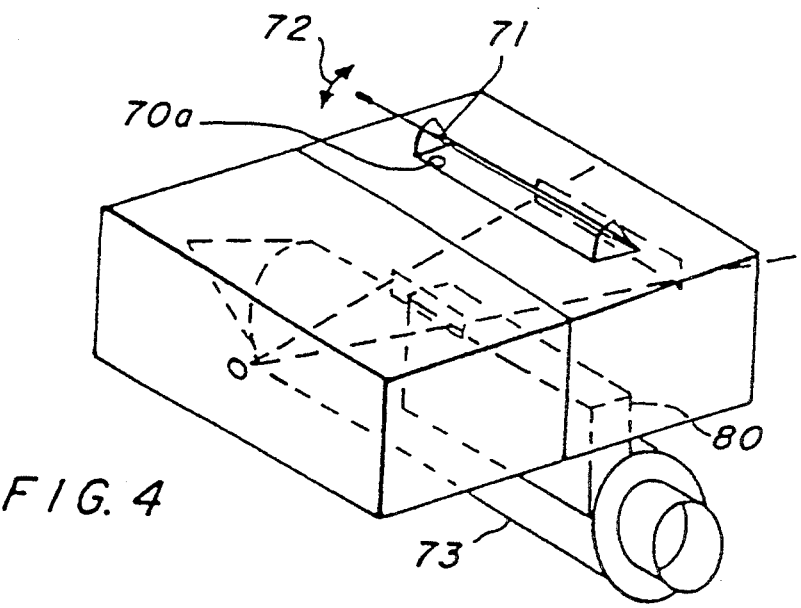
FIG. 4 shows a third embodiment of the invention.

While the embodiment of FIGS. 1 and 2 employs an aspirating fan to create the crosswind, it is to be appreciated that the slipstream of an aircraft can be used to drive the crosswind, thereby precluding the need for a fan and power source. Such an arrangement is shown in FIG. 4 wherein an air intake 70a of adjustable cross-section can be projected into the aircraft slipstream, the cross-section being adjusted to achieve the desired air flow rate. As seen in FIG. 4 the adjustable air intake 70a is in the form of a pivoted flap 71 which opens towards the left in FIG. 4 and is pivoted about its rear edge as indicated by the double-ended arrow 72 to increase or decrease the open area of the flap. With this flap projecting into the slipstream of an airplane (not shown) the air speed of the airplane will provide a ram effect driving air into the intake 70a to an extent dependent upon the pivotal position of the flap 71. Thus the air speed of the aircraft will provide sufficient driving force to move the winnowing airflow through the separation chamber 30, without the need for any fan. FIG. 4 illustrates a cyclone separator 73 connected to the outlet 80 and operative to separate fine droplets from the winnowing airflow.

Figure 5:
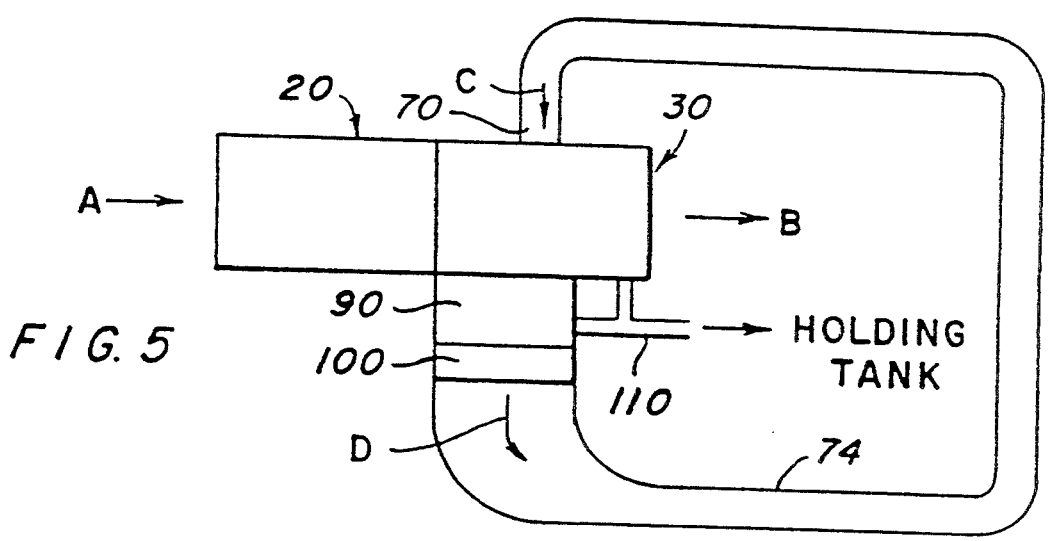
FIG. 5 shows a fourth embodiment of the invention.

As discussed above in relation to FIGS. 1, 2 and 4, the small droplet component is reduced from the spray plume by means of a crosswind. In order to achieve effective removal of the small drop component it is necessary to use a relatively high crosswind speed, preferably in the range 10 to 20 m/s. However, in view of the foreseen usage of the apparatus on aircraft, and on tractor-mounted or tractor-drawn spray rigs, requiring multiple units per vehicle, it is important to maintain a practical size, weight and power requirement for the spraying apparatus. To reduce the power requirement of the apparatus and to enable a compact and lightweight design, in one preferred embodiment as shown in FIG. 5, the flow of winnowing air is recycled. Thus the cleaned airflow exiting the separating means 100 is returned via a smooth walled air duct schematically shown at 74 in FIG. 5 to the air intake 70 on top of the separating chamber 30. The arrangement shown in FIG. 5 is of course schematic, and in practice the return air duct 74 would be positioned at the side of the separating chamber 30 to avoid interference with the spray emerging from the exit slot 60 as indicated by the arrow B in FIG. 5. In this case the airflow would be driven by a tubaxial fan 100, mounted on the exit tube of the separator 90, which may be a cyclone separator. In a prototype apparatus, a 50 watt fan of diameter 10 cm provided a crosswind speed of about 14 m/s at the spray plume, the crosswind air being recirculated through an air duct 74 of 10 cm diameter. The airstream is narrowed to a rectangular slot intake 70 of 18×1 cm, and leaves the separation chamber through a rectangular outlet slot 80 12 cm×3 cm, centered beneath the air intake slot. Additionally, the bottom of the separation chamber is preferably shaped to form a shallow conical depression to assist in directing the crosswind and the separated spray drops into the cyclone separator. With this configuration and an 8002 flat-fan nozzle (Spraying Systems Company, Wheaton, Ill., U.S.A) operated at 276 kPa, a reduction of 95% in the spray volume proportion of drops with a diameter less than 60 microns, and a reduction of 84% in the spray volume proportion of drops with a diameter less than 100 microns were achieved. These figures were obtained using the method described above involving dyed water spray and Kromekote cards to sample the spray plume. These reductions in the small drop proportions were achieved at a relatively high liquid pressure employing a relatively high speed spray plume and therefore providing good small droplet removal under more demanding operating conditions than the previously discussed lower pressure settings.

A modification to the apparatus that was found to provide satisfactory operation was the removal of the wall (26, FIG. 1) separating the atomization and separation chamber. This change simplified construction of the apparatus and removed the potential problem of spray being collected in the atomization chamber, and a requirement for a separate drain. In the prototypes tested with this simplification the crosswind was not observed to significantly interfere with the atomization process.

Another modification to the apparatus that was found to provide satisfactory operation was the removal of the slotted end wall (28, FIG. 1) of the separation chamber. Small drop removal by the crosswind was found to be quite effective even without the use of a slotted end wall. This modification substantially reduced the volume of spray liquid having to be recirculated, due to the fact that the many large drops whose trajectory was well away from the plume centreline were not collected, as they had been in the separation chamber with the slotted end wall in place.

For reasons of practicality it is advantageous for the spraying apparatus to be compact. However, reducing the size of the separation chamber increases the proportion of spray impacting on the walls of the separation chamber. A modification that provided improved operation in prototypes of reduced size, with the end wall (28, FIG. 1) removed, was the slight cupping of the bottom face of the separation chamber. In particular the portion of the bottom face between the crosswind exit slot (80, FIG. 1) and open face was angled upwards slightly to prevent the spray drops impacting on the walls from draining out of the apparatus, by dripping from the open face. With this modification in place the bulk of the spray liquid collected in the separation chamber drained into the separator through the crosswind exit slot (80).

I claim:

1. A spraying apparatus for delivering a spray that is essentially without a small drop component, comprising:
   an atomizer adapted to produce a flat spray, having a small drop component, from a liquid;
   a separation chamber having a drop exit opening;
   means to pass said spray in a path across said chamber to be delivered through said exit opening;
   separation means to remove the small drop component of said spray so that the component passing through said exit opening is essentially free of the small drop component, wherein said separation means comprises means to pass a flow of air transversely through the spray, said flow of air being sufficient to deflect the small drop component out of the spray path without otherwise disrupting the spray; and
   ducting configured to duct said flow of air out of said separation chamber and after separation of the small drop components therefrom, to recirculate said flow of air to said separation chamber to pass repeatedly through said spray.

2. An apparatus according to claim 1 wherein a bottom portion of said separation chamber is configured to collect the deflected component of the spray and direct it to said ducting, said ducting connecting to separation means selected from a group consisting of a cyclone separator, a cascade impactor, and a filter.

3. An apparatus as claimed in claim 1 wherein said atomizer is contained in an atomization chamber adjacent said separation chamber and communicating therewith through a transfer slot.

4. An apparatus as claimed in claim 1 wherein said small drop component consists of drops having a diameter of less than about 60 microns.

5. An apparatus as claimed in claim 1 wherein said apparatus is on a aircraft.

6. An apparatus as claimed in claim 1 wherein said apparatus is on a vehicle.

7. An apparatus as claimed in claim 1 wherein said means to supply a flow of air is a fan located in said ducting.

8. A spraying apparatus as claimed in claim 1 wherein said flat spray is of planar fan-shaped form, said atomizer being contained in an atomization chamber that is adjacent said separation chamber and communications therewith via a transverse slot through which said flat spray enters the separation chamber, said means to supply the flow of air comprising a fan located in said ducting.

9. A method for producing a spray consisting:
   introducing a spray, having a small drop component, in a flat path into a separation chamber having a drop exit opening;
   deflecting the small drop component of said spray transversely out of the path of the spray, such deflection being effected by a flow of air that is passed transversely through said flat path;
   exiting the spray, essentially free of the small drop component, through the exit opening of the separation chamber;
   withdrawing from said separating chamber said flow of air with the small drop component entrained therein;
   treating said flow of air to remove the small drop component therefrom; and thereafter recirculating said flow of air to said separating chamber to once more pass through said spray.

10. A method as claimed in claim 9 wherein said small drop component consists of drops having a diameter of less than about 60 microns.

11. A method as claimed in claim 9 when utilized in spraying a herbicide or pesticide spray.

12. A method as claimed in claim 9 wherein said flow of air has a velocity of between 1 m/s and 20 m/s as it passes through said spray.

13. A method as claimed in claim 9 wherein said flow of air has a velocity of between 10 m/s and 20 m/s as it passes though said spray.

14. A method as claimed in claim 9 wherein said spray is prepared in an atomizer contained in an atomizing chamber before being introduced into said separation chamber.

15. A method as claimed in claim 9 as utilized in the spraying of a herbicide or pesticide spray wherein said flow of air has a velocity of between 10 m/s and 20 m/s as it passes through said spray, the small drop component comprising drops having a diameter of less than about 60 microns.

* * * * *